Patented Nov. 27, 1928.

1,693,244

UNITED STATES PATENT OFFICE.

CHARLES H. MacDOWELL, OF CHICAGO, ILLINOIS, AND HERBERT H. MEYERS, OF PITTSBURGH, PENNSYLVANIA, ASSIGNORS TO ARMOUR FERTILIZER WORKS, OF CHICAGO, ILLINOIS, A CORPORATION OF NEW JERSEY.

PRODUCTION OF SULPHUR DIOXIDE AND HYDROGEN.

No Drawing.    Application filed November 21, 1927. Serial No. 234,902.

We have discovered that if volatilized sulphur or sulphur vapor and an excess of steam or water vapor are brought together at a bright red heat, the following reversible reaction tends to occur to a greater or less extent depending upon the temperature and the time of contact of the gases:—

$$3S + 2H_2O \rightleftharpoons SO_2 + 2H_2 + 2S.$$

The net result of the reaction, as will be readily perceived, is the reduction of water by sulphur as in the following equation:—

$$2H_2O + S \rightleftharpoons SO_2 + 2H_2.$$

Theoretically, then, according to this equation, under proper conditions, it should be possible to obtain four pounds of hydrogen for every sixty-four pounds of sulphur dioxide produced, or, expressed somewhat otherwise, it ought to be feasible theoretically to secure one pound of hydrogen for every eight pounds of sulphur, appearing as sulphur dioxide, this representing an efficiency of conversion of 100%.

When sulphur vapor and an excess of steam were passed together through an empty chamber at temperatures between 900° C. and 1000° C., the exit gases contained over 50% of the hydrogen theoretically obtainable, and, as the temperature was raised above 1000° C., a greater yield of hydrogen was had, but, for practical reasons the temperature of operation was for the most part restricted to from 900° C. to 1000° C.

When the chamber through which the gases were passed was packed with pieces of fire-brick, it was possible to increase the yield of hydrogen to about 75% to 80% of the theoretical amount.

Further increases in the yield were also effected when using fire-brick impregnated with certain metals or oxides of metals, or by the employment of these substances by themselves, such as nickel oxide, cobalt oxide, vanadium oxide, chromium oxide, titanium oxide uranium oxide, tungsten oxide, platinum or the other metals of the platinum group.

The best results however, were secured by the use of iron oxide as a catalyst, and, at a temperature of 1000° C., yields of 97% or better of the hydrogen theoretically obtainable were achieved.

The procedure was as follows:—

Sulphur was heated in a receptacle until it volatilized or vaporized and steam, generated in a separate boiler, was passed over the molten sulphur and mixed with the sulphur vapor, such water vapor being in excess of that required by the reaction.

The mixed gases were then caused to flow through a tube packed or charged with the catalytic material and heated to from 900° C. to 1000° C., the gases issuing or discharging from the tube consisting of water vapor, sulphur, sulphur dioxide and hydrogen, with traces at times of hydrogen sulphide.

The water vapor was condensed together with any sulphur which collected in the water, and the sulphur dioxide was either scrubbed out of the gas with water, or condensed as liquid $SO_2$ in any one of several known ways, the residual gas being practically all hydrogen.

If it is desired to produce pure hydrogen for various uses the impure hydrogen gas may be scrubbed with an alkaline solution, which will remove the last traces of sulphur compounds.

Preferably, the sulphur condensed from the exit gases is recovered and returned for re-use in the apparatus by which the process is practiced.

The invention, therefore, in general, consists in heating together, preferably but not necessarily in the presence of a catalyst, sulphur vapor and steam, the latter desirably in excess quantity, to about 900° C. or over, to produce a gaseous mixture containing hydrogen and sulphur dioxide, from which the latter is removed and may be condensed, the hydrogen produced being suitable for the manufacture of synthetic ammonia or various hydrogenation processes, or for other uses.

We claim:

1. The process which consists of heating a mixture of sulphur-vapor and steam in the presence of iron-oxide as a catalyst at a temperature and for a period of time sufficient to produce a gaseous mixture containing sulphur-dioxide and hydrogen and recovering said sulphur-dioxide and hydrogen individually from such mixture.

2. The process which consists of heating a mixture of sulphur-vapor and steam in the presence of iron-oxide as a catalyst at a temperature of about nine hundred (900°) degrees centigrade to produce a gaseous mixture containing sulphur-dioxide and hydrogen and recovering said sulphur-dioxide and hydrogen individually from such mixture.

3. The process which consists of heating a mixture of sulphur-vapor and an excess of steam in the presence of iron-oxide as a catalyst at a temperature of not less than about nine hundred (900°) degrees centigrade to produce a gaseous mixture containing steam, sulphur, sulphur-dioxide and hydrogen, condensing the steam and sulphur, removing the sulphur-dioxide leaving the residual hydrogen and using such recovered sulphur in the production of further sulphur vapor for a continuance of the process.

In witness whereof we have hereunto set our hands.

CHARLES H. MacDOWELL.
HERBERT H. MEYERS.